US007725891B2

(12) United States Patent
Demuth et al.

(10) Patent No.: US 7,725,891 B2
(45) Date of Patent: May 25, 2010

(54) METHOD FOR EFFECTING CHANGES IN A SOFTWARE SYSTEM LANDSCAPE AND COMPUTER SYSTEM

(75) Inventors: Michael Demuth, Rauenberg (DE); Volker Schulz, Heppenheim (DE); Herbert Stegmuller, Bruchsal (DE)

(73) Assignee: SAP AG, Walldorf (DE)

( * ) Notice: Subject to any disclaimer, the term of this patent is extended or adjusted under 35 U.S.C. 154(b) by 871 days.

(21) Appl. No.: 11/261,816

(22) Filed: Oct. 27, 2005

(65) Prior Publication Data

US 2006/0203812 A1    Sep. 14, 2006

(30) Foreign Application Priority Data

Oct. 27, 2004    (EP)    ................................. 04025508

(51) Int. Cl.
*G06F 9/44*    (2006.01)
(52) U.S. Cl. ........................ 717/168; 717/172; 717/177
(58) Field of Classification Search ......... 717/120–123, 717/168–178, 124; 709/201–203, 217–219, 709/102; 718/100; 707/9
See application file for complete search history.

(56) References Cited

U.S. PATENT DOCUMENTS

| | | | | |
|---|---|---|---|---|
| 5,237,688 A | * | 8/1993 | Calvert et al. | ................ 717/121 |
| 5,495,610 A | | 2/1996 | Shing et al. | |
| 5,608,721 A | | 3/1997 | Natarajan et al. | |
| 5,745,767 A | * | 4/1998 | Rosen et al. | ................ 717/124 |
| 5,845,090 A | | 12/1998 | Collins, III et al. | |
| 5,859,977 A | | 1/1999 | Nishiyama et al. | |
| 5,860,007 A | | 1/1999 | Soni et al. | |
| 5,953,533 A | | 9/1999 | Fink et al. | |

(Continued)

FOREIGN PATENT DOCUMENTS

JP    2001265603    9/2001

(Continued)

OTHER PUBLICATIONS

IBM Corporation, "IBM Tivoli Configuration Manager—User's Guide for Software Distribution—Version 4.2",XP-2325607, (Oct. 2002), 358 pgs.

(Continued)

*Primary Examiner*—Lewis A Bullock, Jr.
*Assistant Examiner*—Carina Yun
(74) *Attorney, Agent, or Firm*—Schwegman, Lundberg & Woessner, P.A.

(57) ABSTRACT

A method for effecting changes in a software system landscape with a plurality of logical software systems that are interconnected by logical transport paths, comprises: providing system role types, each system role being associated with one of a plurality of system role types; providing low level operational tasks associated to system role types; providing a transport track that defines a route through logical systems in a particular order and that specifies one source system, adjacent interconnected systems, and at least one target system; providing high level operational tasks in a software development system that define software changes; generating transport requests for transporting the software changes; and generating a low level operational task list for the logical systems affected by the changes to the software by: analyzing the transport track(s) and the system role types and selecting low level operational tasks associated with the system role types according to the high level operational tasks.

12 Claims, 5 Drawing Sheets

U.S. PATENT DOCUMENTS

| | | | |
|---|---|---|---|
| 6,110,228 | A | 8/2000 | Albright et al. |
| 6,263,358 | B1 * | 7/2001 | Lee et al. ............... 718/100 |
| 6,308,173 | B1 * | 10/2001 | Glasser et al. ............ 707/9 |
| 6,513,132 | B1 | 1/2003 | Suzuki |
| 7,020,690 | B1 | 3/2006 | Haitsuka et al. |
| 7,107,331 | B2 | 9/2006 | Gava et al. |
| 2001/0052074 | A1 | 12/2001 | Pensak et al. |
| 2002/0026592 | A1 | 2/2002 | Gavrila et al. |
| 2002/0103851 | A1 | 8/2002 | Kikinis |
| 2002/0129356 | A1 | 9/2002 | Hellerstein et al. |
| 2002/0156798 | A1 | 10/2002 | Larue et al. |
| 2002/0169878 | A1 | 11/2002 | Orenshteyn |
| 2002/0174164 | A1 * | 11/2002 | Hayashi ............... 709/102 |
| 2002/0184398 | A1 | 12/2002 | Orenshteyn |
| 2002/0198725 | A1 | 12/2002 | Piepenbrink et al. |
| 2003/0040974 | A1 | 2/2003 | Chauvin et al. |
| 2003/0084350 | A1 | 5/2003 | Eibach et al. |
| 2003/0093516 | A1 | 5/2003 | Parsons et al. |
| 2003/0142627 | A1 | 7/2003 | Chiu et al. |
| 2004/0010708 | A1 | 1/2004 | Johnson et al. |
| 2004/0060044 | A1 | 3/2004 | Das et al. |
| 2004/0081183 | A1 | 4/2004 | Monza et al. |
| 2004/0117795 | A1 | 6/2004 | Wang et al. |
| 2004/0267935 | A1 | 12/2004 | Patiejunas |
| 2005/0080888 | A1 | 4/2005 | Walter |
| 2005/0209732 | A1 | 9/2005 | Audimoolam et al. |
| 2005/0210501 | A1 | 9/2005 | Zigmond et al. |
| 2006/0112189 | A1 | 5/2006 | Demuth et al. |
| 2006/0117311 | A1 | 6/2006 | Demuth et al. |
| 2006/0123392 | A1 | 6/2006 | Demuth et al. |
| 2006/0123407 | A1 | 6/2006 | Demuth et al. |
| 2006/0143614 | A1 | 6/2006 | Lier et al. |
| 2006/0149813 | A1 | 7/2006 | Janik |
| 2006/0155832 | A1 | 7/2006 | Demuth et al. |
| 2006/0164257 | A1 | 7/2006 | Giubbini |
| 2007/0038610 | A1 | 2/2007 | Omoigui |
| 2008/0183840 | A1 | 7/2008 | Khedouri et al. |

FOREIGN PATENT DOCUMENTS

| | | |
|---|---|---|
| WO | WO-01/63482 | 8/2001 |
| WO | WO-03060718 A1 | 7/2003 |

OTHER PUBLICATIONS

IBM Corporation, "Tivoli software distribution users guide 4.1", (636 pg book) XP-002321301, Relevant pp., pp. 1, 4, 5, 10, 11, 12, 163, 176, 177, 251, 252, 262, 407, 436, 439, 443, , 449, 450, 452, 577.

McFarland Metzger, Sue S., et al., SAP R/3—Systemlandschaft Implementieren und warten (English translation), XP-002325774, pp. 419, 461, 465.

Schneider-Neureither, Andreas, "SAP System Landscape Optimization" (book), SaP Press, 2004, ISBN 1-59229-026-4, (2004) 220 pgs.

Bawtree, Hugh, "A tool for managing change; Software Development", XP-002321302. (Aug. 2000), 18 pgs.

Dabrowski, C , et al., "Understanding self healing in service discovery systems", XP-002323534, 6 pgs.

Hodgson, Alan, "Intel eBusiness Engineering Release Management and Application Landing", XP-002321303 *Intel Technoloy Journal*, Q4, (2000), 1-9.

IBM Document Center, "Publication information", XP-2325608, (Observed Apr. 21, 2005), 1 pg.

Szallies, Constantin , "On Using the Observer Design Pattern", XP-002323533, (Aug. 21, 1997), 9 pgs.

" U.S. Appl. No. 11/262,343, Non-Final Office Action mailed Nov. 28, 2008", 16 pgs.

"U.S. Appl. No. 11/262,343, Response filed Jan. 30, 2009 to Non-Final Office Action mailed Nov. 28, 2008", 13 pgs.

"U.S. Appl. No. 11/262,442, Non-Final Office Action mailed Jan. 7, 2009", 16 pgs.

"U.S. Appl. No. 11/262,543, Non-Final Office Action mailed Dec. 30, 2008", 11 pgs.

"U.S. Appl. No. 11/262,543, Response filed Mar. 9, 2009 to Non-Final Office Action mailed Dec. 30, 2008", 14 pgs.

"U.S. Appl. No. 11/262,343, Advisory Action mailed Jun. 30, 2009", 5 pgs.

"U.S. Appl. No. 11/262,343, Final Office Action mailed Apr. 27, 2009", 11 pgs.

"U.S. Appl. No. 11/262,343, Response filed Jun. 15, 2009 to Final Office Action mailed Apr. 27, 2009", 12 pgs.

"U.S. Appl. No. 11/262,442, Response filed Apr. 27, 2009 to Non Final Office Action mailed Jan. 7, 2009", 17 pgs.

"U.S. Appl. No. 11/262,543, Advisory Action mailed Jul. 1, 2009", 3 pgs.

"U.S. Appl. No. 11/262,543, Final Office Action mailed Apr. 27, 2009", 13 pgs.

"U.S. Appl. No. 11/262,543, Pre-Appeal Brief Request mailed Jul. 20, 2009", 5 pgs.

"U.S. Appl. No. 11/262,543, Response filed Jun. 15, 2009 to Final Office Action mailed Apr. 27, 2009", 11 pgs.

"U.S. Appl. No. 11/262,043, Non-Final Office Action mailed Oct. 27, 2009", 11 Pgs.

"U.S. Appl. No. 11/262,143, Non-Final Office Action mailed Oct. 8, 2009", 10 pgs.

"U.S. Appl. No. 11/262,343, Non-Final Office Action mailed Sep. 14, 2009", 16 Pgs.

"U.S. Appl. No. 11/262,442, Non-Final Office Action mailed Aug. 31, 2009", 18 pgs.

"U.S. Appl. No. 11/262,543, Notice of Allowance mailed Sep. 15, 2009", 10 Pgs.

* cited by examiner

METHOD FOR EFFECTING CHANGES IN A SOFTWARE SYSTEM LANDSCAPE AND COMPUTER SYSTEM

CLAIM OF PRIORITY

The present patent application claims the priority benefit of the filing date of European Application (EPO) No. 04 025 508.5 filed Oct. 27, 2004, which is incorporated herein by reference.

TECHNICAL FIELD

This application relates generally to servicing of a software system landscape, and more particularly to a method for effecting changes in a software system landscape and to a computer system.

BACKGROUND

Complex software like applicant's SAP R/3 Release 4.5 (SAP) requires customization, e.g. selection of predefined functionality, and adaptation, e.g. addition of or amendment to functionality, as well as other servicing like program and data updates, cf. "SAP System Landscape Optimization" by A. Schneider-Neureither (Ed.), SAP Press, 2004, ISBN 1-59229-026-4, and "SAP R/3 Änderungs-und Transportmanagement" by Metzger and Röhrs, Galileo Press GmbH, Bonn, Germany, 4$^{th}$ reprint 2004, ISBN 3-934358-42-X.

Before such servicing may be performed, however, it has to be assured that the customizations, adaptations, program and data updates etc. are free of errors and integrate flawlessly into the software and data environment. In a factory for instance servicing errors are bound to result in costly workflow disruptions due to software malfunction or data corruption. Apart from the servicing side, other use of the software like training of new or inexperienced users may also result in a disruption of the productive system.

Such complex software may therefore be implemented in form of separate logical systems that together form a system landscape. A typical implementation of the aforementioned SAP software for instance may, cf. FIG. 1, comprise a development system 101 for customizing and development work, a quality assurance system 102 for testing functionality using representative test data, a training system 103 for training new users, and several productive systems 104, e.g. each for a different factory, for actual productive use. Other or additional users and systems may be defined according to the particular requirements.

The logical systems are identical in large parts, function autonomously and may be run on a single computer. The quality assurance system 102 for example resembles the productive system 104 in that it provides all the functionality, its present data and additionally special test data. New customization settings or adaptations may thus be thoroughly tested in the quality assurance system 102 without jeopardizing the productive system 104. Likewise, the training system 103 resembles the productive system 104 in that it provides some of the functionality and special test data. A new user using the training system 103 may thus become accustomed to the functionality and observe the effect of his actions, albeit without disturbing the productive system 104.

A transport management system connects the logical systems and serves to forward software services between systems of the system landscape via logical transport paths 105. A service may for example be approved in the development system 101 for export. It will then be forwarded to an input buffer of the quality assurance system 102. Import into the quality assurance system 102 is approved or denied manually by an operator. Thereafter, the software service is forwarded to the quality assurance system 102, and then to the training system 103 and the productive systems 104 where it will be imported following manual approval by an operator.

The servicing including the adaptation and customization is usually planned using a software development or project management system 200, e.g. SAP's cProject, cf. FIG. 2. The system 200 usually comprises an administrative part 201 that is concerned with time and resource management for effecting the changes, an operational part 202 that is concerned with the implementation of the changes in the landscape, and an analytical part 203 that is concerned with the analysis of the changes. The operational part 202 defines high level operational tasks like "generate a transport request comprising a change", "test change", "train users", "implement change in productive system" etc. An operator needs to implement low level operational tasks based on the high level operational tasks, the low level tasks defining the particular tasks on a system basis for routing software services through the system landscape and importing them into logical systems. This requires an analysis of the system landscape layout, of the route that each service takes through the system landscape, project status switches in each system that define the respective system's changeability options, attributes in each service that define properties of the service etc. Import of services and other tasks are performed based on this analysis.

This process is time consuming and bears the risk of errors. In view of the fact that an SAP R/3 implementation may comprise dozens of systems and require thousands of services per month during development work, the operator time required becomes considerable as does the risk for errors to occur.

SUMMARY

According to one aspect, a method is provided for effecting changes in a software system landscape with a plurality of logical software systems that are interconnected by logical transport paths, including providing one of a plurality of system roles for each logical system; providing system role types, each system role being associated with one of the system role types; providing an association of low level operational tasks to system role types; providing a transport track that defines a route through logical systems in a particular order and that specifies one source system, adjacent interconnected systems, and at least one target system; providing high level operational tasks in a software development system that define software changes; generating transport requests for transporting the software changes; generating a low level operational task list for the logical systems affected by the changes to the software by: analyzing the transport track(s) to establish which systems are affected by each high level operational task, analyzing the system role types of the affected systems, and selecting low level operational tasks associated with the system role types according to the high level operational tasks; and executing the low level operational tasks in the list for routing the transport requests through the system landscape and for effecting the software changes.

In a further aspect, a computer system is provided comprising: a software system landscape with a plurality of logical software systems that are interconnected by logical transport paths; a plurality of system roles for each logical system; system role types, each system role being associated with one of the system role types; an association of low level operational tasks to system role types; a transport track that defines a route through logical systems in a particular order and that specifies one source system, adjacent interconnected systems, and at least one target system; means for providing high level operational tasks in a software development system that define software changes; means for generating transport requests for transporting the software changes; means for generating a low level operational task list for the logical systems affected by the changes to the software by: analyzing the transport track(s) to establish which systems are affected by each high level operational task, analyzing the system role types of the affected systems, and selecting low level operational tasks associated with the system role types according to the high level operational tasks; and means for executing the low level operational tasks in the list for routing the transport requests through the system landscape and for effecting the software changes.

In a still further aspect, a computer program product is provided, the computer program product comprising on a storage medium a computer code that upon execution on a computer system performs the method according to the invention.

Embodiments thus provides an automated generation of low level operational tasks from high level operational tasks of a software development system, e.g. SAP's cProject.

BRIEF DESCRIPTION OF THE DRAWINGS

Further embodiments of the invention are inferable from the following description and the claims.

DETAILED DESCRIPTION

Figure 3:
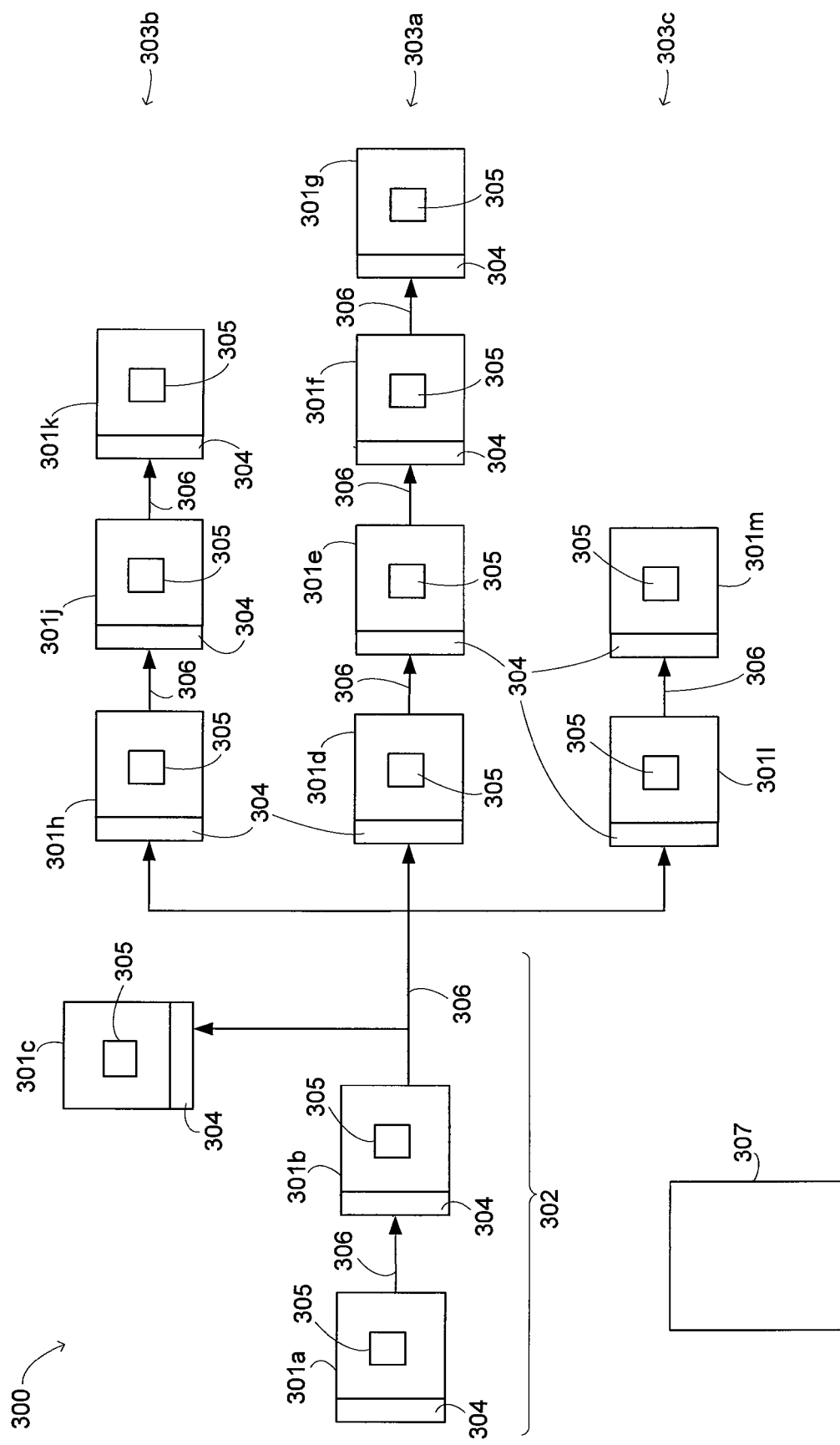
FIG. 3 illustrates a system landscape according to an example embodiment of the invention.

The embodiment shown in FIG. 3 illustrates an SAP R/3 Release 4.5 system landscape 300 with separate logical systems 301 that are here divided into a global part 302, e.g. at a main development and production facility, and local parts 303a, 303b, 303c, e.g. at other production facilities.

The global part 302 may comprise at least a development system 301a for customizing and development work, a quality assurance system 301b for testing functionality using representative test data, and a productive system 301c for actual productive use.

The local part 303a comprises a development system 301d for customizing and development work of local adaptations to SAP, e.g. to meet different legal requirements if part 303a is located in a different country than the global part 302. The local part 303a further comprises a quality assurance system 301e for testing functionality using representative test data, a training system 301f for training new users, and a productive system 301g for actual productive use.

The local part 303b comprises a development system 301h, a quality assurance system 301j and a productive system 301k, but no training system. The local part 303c is a two system landscape comprising a development system 301l and a productive system 301m only.

The system landscape may be different according to the actual requirements. Fewer or more, different or differently connected or grouped systems 301 may be defined as needed.

The logical systems 301 are identical in large parts and function autonomously. The quality assurance system 301j for example resembles the productive system 301k in that it provides all the functionality, its present data and additionally special test data. New customization settings or adaptations may thus be thoroughly tested in the quality assurance system 301j without jeopardizing the productive system 301k.

Each system 301 comprises an import buffer 304 for buffering incoming software services and means 305 for communication with a central system 307. A transport management system connects the logical systems 301 and serves to route software services across the system landscape via logical directional transport paths 306. A software service effects a software change and may for example relate to customization of a system 301, e.g. a selection of predefined functionality in the system 301, or an adaptation of a system 301, e.g. an addition of or amendment to functionality, or to program and data updates or hot fixes or patches the like. Transport tracks are provided that each define one or more particular routes for software services along the transport paths through the system landscape. A transport track may for example define the route from system 301a through systems 301b, 301h, 301j to system 301k. Another transport track may define the route from system 301d through systems 301e, 301f to system 301g. Transport tracks with branches may also be provided, e.g. from system 301a to system 301b and then in a first branch to system 301c and in a second branch to systems 301l, 301m. There may be more than one transport track per system landscape, each transport track being assigned to a project context like a development project for the local part 303a only or a documentation project for the global part 302 only etc.

The systems 301 of each part 302, 303a, 303b, 303c and the central system 307 may be located and simultaneously executed in a single computer, but may be distributed across separate hardware. The global part 302 and the local parts 303a, 303b, 303c each run on physically separate computer systems, which themselves may comprise different computers.

Figure 4:
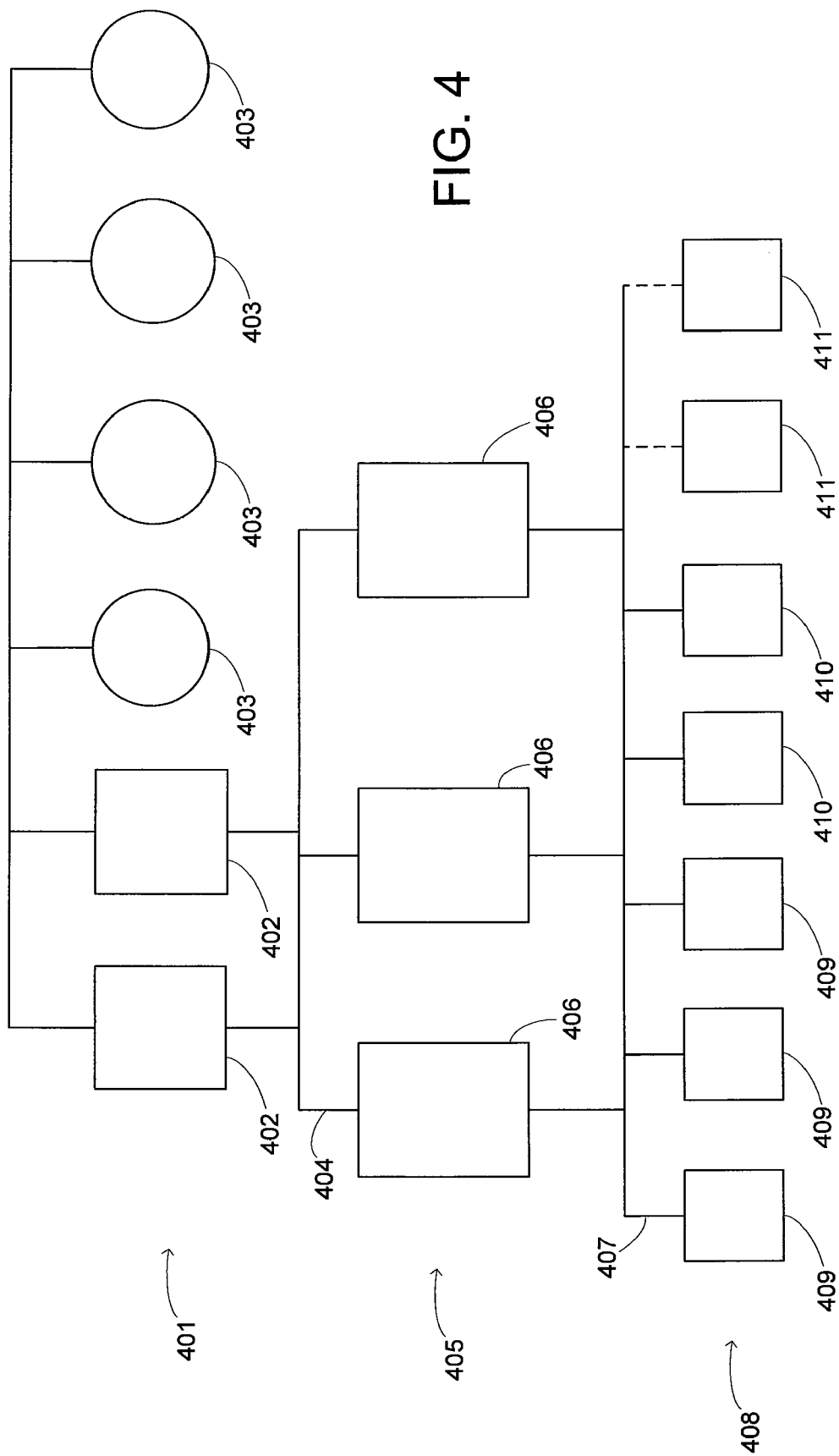
FIG. 4 shows an example embodiment of the hardware of a computer system according to an example embodiment of the invention.

An example implementation of the local part 303a may comprise, cf. FIG. 4, a data base layer 401 for storing and retrieving business data like a factory inventory, employee data, sales figures etc. The data base layer 401 comprises one or more data base servers 402 and four data bases 403, one for each of the systems 301d, 301e, 301f and 301g.

Connected to the data base layer 401 by a suitable network 404, e.g. a LAN, is an application layer 405 for execution of the software of the systems 301d, 301e, 301f and 301g. The application layer 405 comprises one or more application servers 406.

Finally, connected to the application layer 405 by a suitable network 407, e.g. a LAN, is a presentation layer 408 for the graphical user interface (GUI). The presentation layer 408 comprises dumb terminals 409, Personal Computers 410 and/or wireless access devices 411 like PDAs.

Each system 301 has associated therewith a system role which defines the respective system's function within the landscape. The system 301a, 301b and 301c for example, have the roles "development system in the global part", "quality assurance system in the global part" and "productive system in the global part", respectively. The systems 301l and 301m have the roles "development system in the local part 303c" and "productive system in the local part 303c", respectively. The other systems 301 have corresponding roles. In SAP, the system roles are typically defined in the Solution Manager for Implementation.

According to an example embodiment, system role types are provided. System role types may comprise the following:
- D Source systems: Transport requests comprising a software service are generated in a system of this type, usually a development system.
- O Follow-on system: A transport request is imported into a system of this type and forwarded to at least one other system.
- P Target system: A transport request is imported into a system of this type but not forwarded. Target systems are typically productive systems.

In the embodiment of FIG. 3 the development systems 301a, 301h, 301d and 301l are of system role type D, the productive systems 301c, 301k, 301g and 301m are of system role type P and the systems 301b, 301j, 301e and 301f between the development systems and the productive systems are of the system role type O. Other and/or additional system types may be provided.

Figure 5:
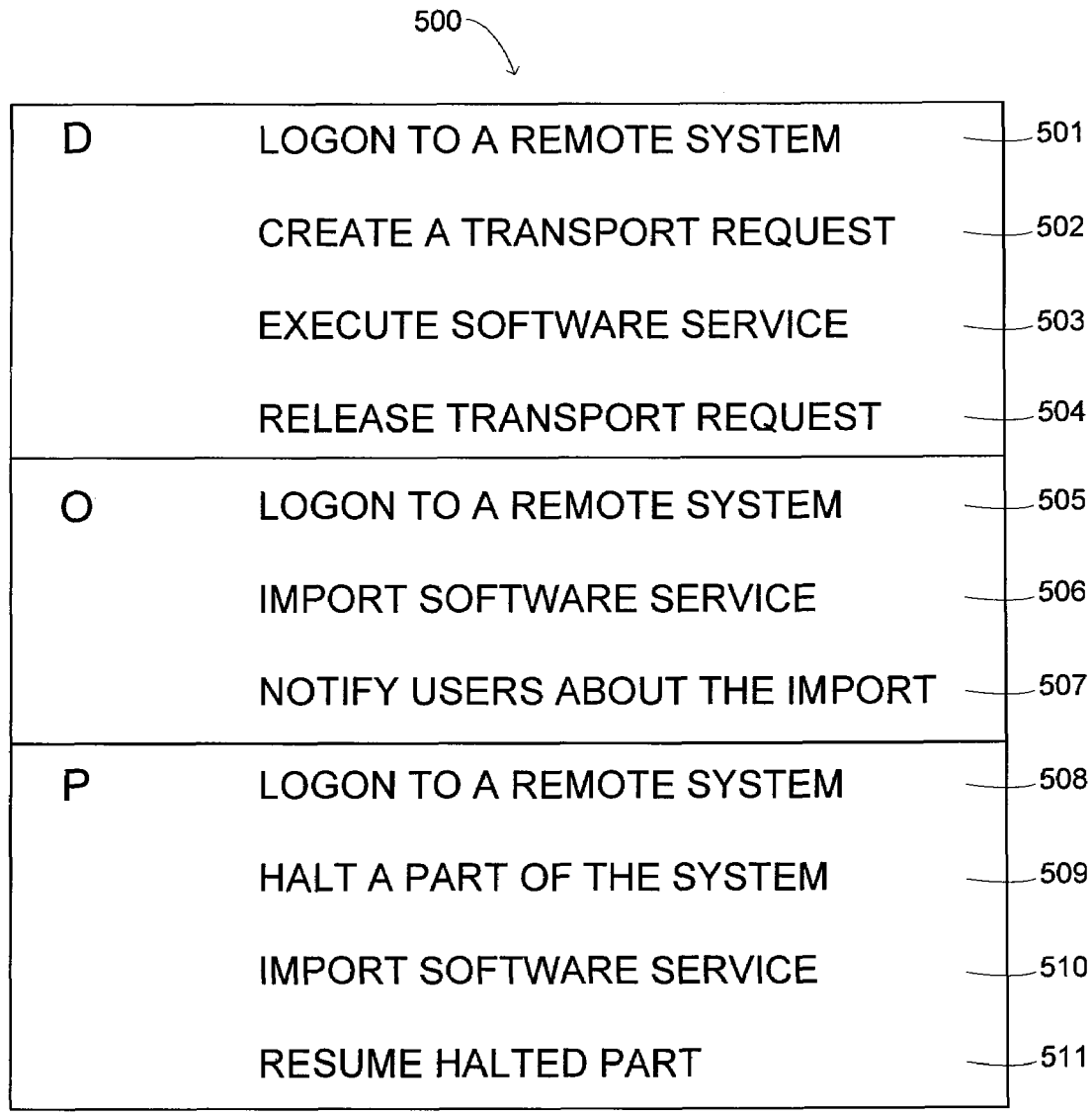
FIG. 5 illustrates a list of tasks associated to system role types.

Low level operational tasks are assigned to system role types. The low level operational tasks may be marked as compulsory and may comprise the following:
for type D:
  logon to remote system
  generate transport request with a software service
  effect the software service
  release transport request for forwarding
for type O:
  logon to remote system
  import transport request from input buffer
  notify users of import
  notify quality management and await release
for type P:
  logon to remote system
  import transport request from input buffer In the example of FIG. 5 a list 500 contains for the system role type D a task 501 to logon to a remote system, a task 502 to create a transport request for a software service, a task 503 to execute the software service in the remote system, and a task 504 to release the transport request to the system landscape. For the system role type O the list 500 comprises a task 505 to logon to a remote system, a task 506 import a software service and a task 507 to notify the users of the system about the import. For the system role type P the list 500 comprises a task 508 to logon to a remote system, a task 509 to halt a part of the system, a task 510 to import a software service and a task 511 to resume the halted part of the system. Other and/or additional tasks as well as attributes like "compulsory" may be provided. For example, a task to collectively import software services, a task to check certain system properties, a task to check the status of a different system and, if the status indicates a first state, importing a software service, and if the status indicates a second state, not importing a software service but scheduling a new check at a different point in time, a task to check the interdependencies of software services in the buffer and to reorder them to avoid mutual overwriting, etc.

Figure 1:
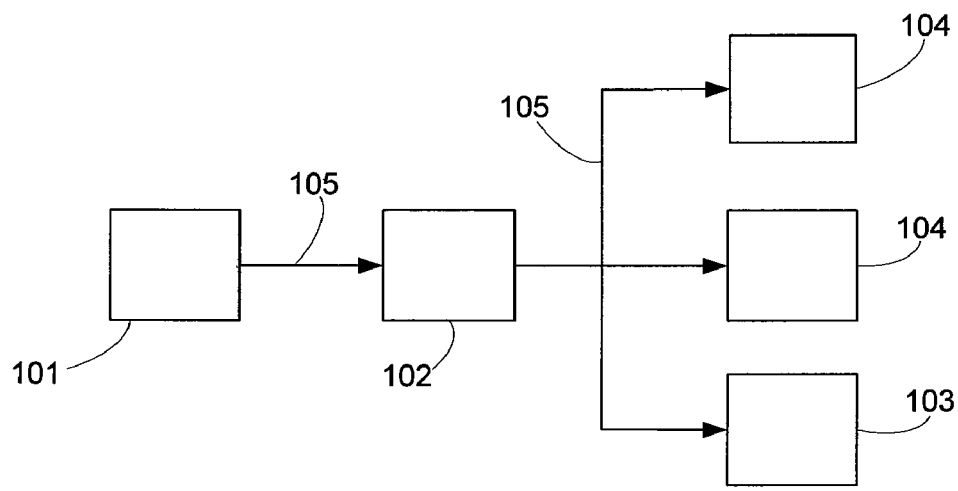
FIG. 1 shows a system landscape of the prior art.
Figure 2:
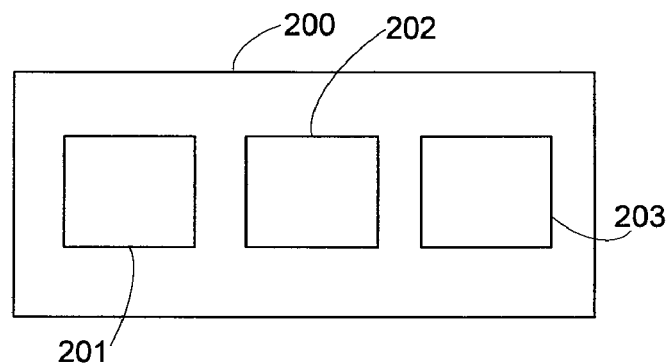
FIG. 2 illustrates a software development system of the prior art.

According to high level operational tasks in a software development system as illustrated by FIG. 2, e.g. SAP's cProject, a transport request is generated that transports a software change. A transport request is structured data comprising an identifier, e.g. DEVK900251, general information regarding the software change, e.g. indicating that the service is a program patch, and service data, e.g. a piece of program code.

Based on the high level operational tasks, the transport tracks, the system role types and the list 500, a low level operational task list is automatically generated in the central system 307. The task list contains all tasks that are required to effect the software change(s) in the system landscape. Tasks in the task list may be displayed, executed, managed, analyzed and documented from the central system 307 by suitable software, e.g. SAP's Schedule Manager. For that purpose, the tasks may provide spool lists, statuses, application logs, job logs etc. to the central system 307 or generate that information in the central system 307.

The low level operational task list may have a hierarchical structure. The top level contains one entry per transport track. The next level contains one entry per system role type, even in case that no system of corresponding type is defined. The next level contains one entry per system role, only if this role is used by a system. The lowest level contains the tasks for each system. If the software development system defines sequential phases for the implementation, e.g. a first phase for effecting first software changes in a first selection of systems and a second phase for effecting the first software changes in a second selection of systems, then the hierarchy may contain a level for the phase above the level for the transport track.

Figure 6:
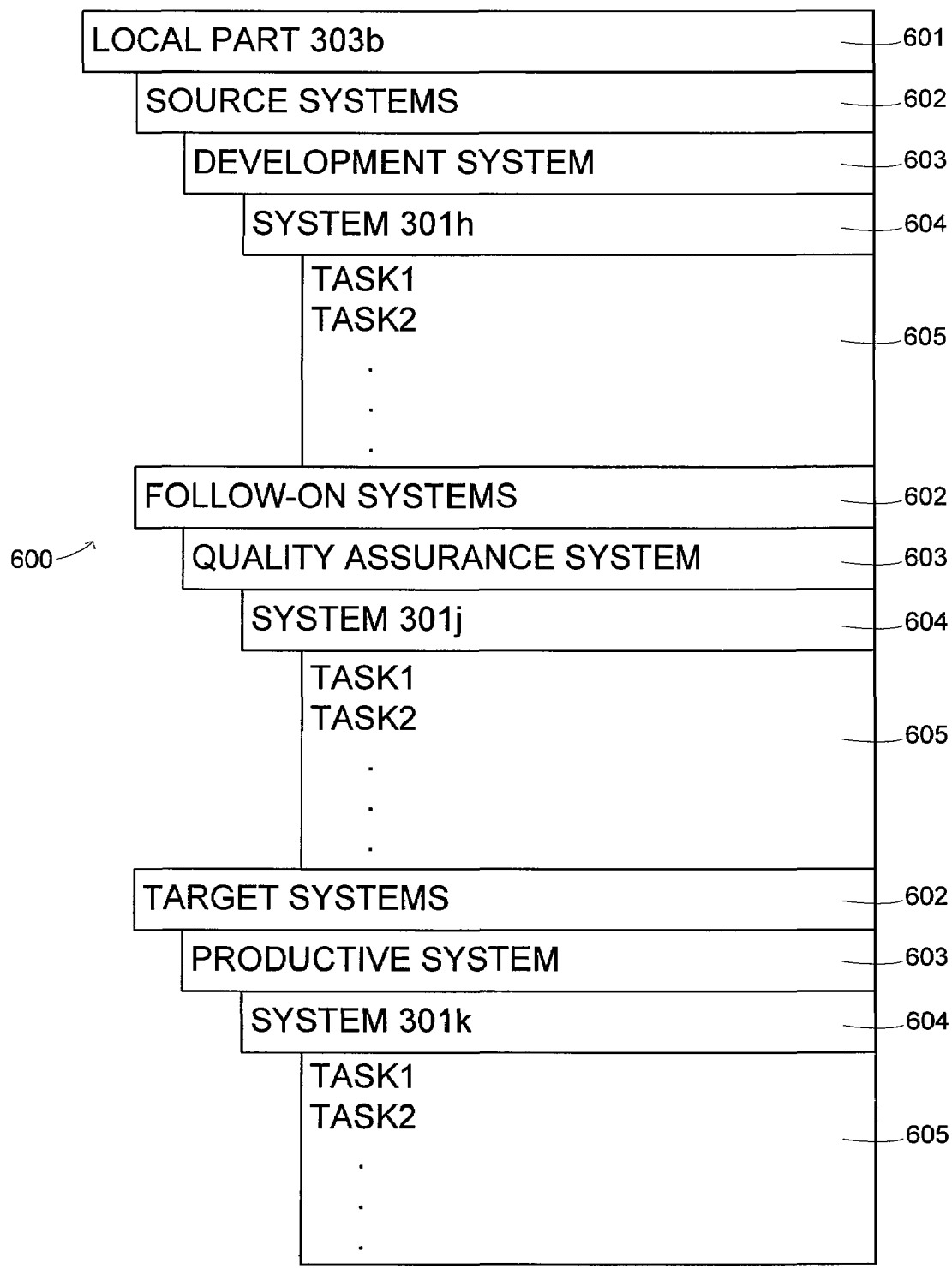
FIG. 6 illustrates a low level operational task list.

An exemplary low level operational task list 600 is illustrated in FIG. 6 and has here a structure that is hierarchically grouped according to transport track 601, system role types 602, system roles 603, systems 604 and finally tasks 605. The tasks are associated to particular systems. The grouping allows to block and unblock groups of tasks.

According to an example embodiment of a method of the invention, system roles and system role types are provided, the systems of the system landscape are associated to the system roles and a list of low level operational tasks is associated to system role types. At least one transport track is provided that defines a route for transport requests through systems in a particular order and specifies one source system in which software services are permitted, adjacent interconnected systems, and at least one end or target system. High level operational tasks are generated that define what needs to be changed how and when. Based on the high level operational tasks, the system role types, the list and the transport tracks, low level operational tasks for effecting the software change are automatically generated. This involves analyzing the transport tracks to identify the systems that need to be passed, analyzing them to identify their system roles, analyzing the system roles to identify their type, and selecting tasks for the affected systems from the list according to the high level operational tasks. The low level operational tasks are then performed sequentially upon operator commands. The operator does not need to consider the system landscape and the transport tracks and other information to compile the tasks, but merely has to authorize the automatically generated low level tasks.

Although the foregoing has been a description of an example embodiment of the invention, it will be apparent to those skilled in the art upon review of this disclosure that numerous variations and modifications may be made in an embodiment of the invention. For example, instead of using SAP R/3 Release 4.5, other SAP and non-SAP systems may benefit from the invention.

What is claimed is:

1. A method to effect changes in a software system landscape with a plurality of logical software systems that are interconnected by logical transport paths, comprising:

providing one of a plurality of system roles for each logical system;

providing system role types, each system role of the plurality of system roles being associated with one of the system role types, low level operational tasks being assigned to the system role types, the system role types comprising source systems, follow-on systems, and target systems, the follow-on systems comprising at least one of a training system, a testing system, and or a quality assurance system;

providing a transport track comprising at least one transport path, the transport track defining a route through logical systems subsequently and that specifies one source system, at least one of the follow-on systems, and at least one target system;

generating transport requests for transporting software changes;

providing high level operational tasks in the software development system that define software changes;

automatically generating a separate and distinct low level operational required task list in the software development system for each of the separate computer systems affected by the software changes by:

analyzing the at least one transport track to establish which systems are affected by each high level operational task, analyzing the system role types of the affected systems, and selecting low level operational tasks associated with the system role types according to the high level operational tasks; and executing the low level operational tasks in the respective list by the respective system for routing the transport requests through the system landscape and for effecting the software changes.

2. The method of claim 1, wherein the low level operational task list is generated with hierarchy levels.

3. The method of claim 2, wherein the hierarchy levels are generated to include a transport track level, a system role type level below the transport track level, a system role level below the system role type level, a system level below the system role level and a task level below the system level.

4. The method of claim 3, wherein the hierarchy levels are generated to include a software development phase level above the transport track level.

5. The method of claim 1, wherein the tasks in the respective system are executed from a central system.

6. A computer system comprising:

a system landscape with a plurality of separate computer-systems that are interconnected by logical transport paths;

a plurality of system roles for each of the separate computer systems;

system role types, each system role being associated with one of the system role types, low level operational tasks being assigned to the system role types, the system role types comprising source systems, follow-on systems, and target systems, the follow-on systems comprising at least one of a training system, a testing systems, and a quality assurance system;

a transport track that defines a route through the separate computer systems in a particular order and that specifies one source system, at least one of the follow-on systems, and at least one target system;

means for providing high level operational tasks in a software development system that define software changes;

means for generating transport requests for transporting the software changes;

means for automatically generating a separate and distinct low level operational required task list for each of the separate computer systems affected by the software changes by:

analyzing the transport track(s) to establish which systems are affected by each high level operational task, analyzing the system role types of the affected systems, and selecting low level operational tasks associated with the system role types according to the high level operational tasks; and means for executing the low level operational tasks in the respective list by the respective system for routing the transport requests through the system landscape and for effecting the software changes.

7. The system of claim 6, wherein the low level operational task list comprises hierarchy levels.

8. The system of claim 7, wherein the hierarchy levels include a transport track level, a system role type level below the transport track level, a system role level below the system role type level, a system level below the system role level and a task level below the system level.

9. The of claim 8, wherein the hierarchy levels include a phase level above the transport track level.

10. The system of claim 6, wherein the tasks in the respective system are executable from a central system.

11. A computer readable storage medium having embodied thereon instructions executable by one or more processors for performing a method for effecting changes in a software system landscape with a plurality of logical software systems, that are interconnected by logical transport paths, the methods comprising:

providing one of a plurality of system roles for each logical system;

providing system role types, each system role of the plurality of system roles being associated with one of the system role types, low level operational tasks being assigned to the system role types, the system role types comprising source systems, follow-on systems, and target systems, the follow-on systems comprising at least one of a training system, a testing systems, and a quality assurance system;

providing a transport track comprising at least one transport path, the transport track defining a route through logical systems subsequently and that specifies one source system, at least one of the follow-on systems, and at least one target system;

generating transport requests for transporting software changes;

providing high level operational tasks in the software development system that define software changes;

automatically generating a separate and distinct low level operational required task list in the software development system for each of the separate computer systems affected by the software changes by:

analyzing the at least one transport track to establish which systems are affected by each high level operational task, analyzing the system role types of the affected systems, and selecting low level operational tasks associated with the system role types according to the high level operational tasks; and executing the low level operational tasks in the respective list by the respective system for routing the transport requests through the system landscape and for effecting the software changes.

12. A computer system comprising:
- a system landscape with a plurality of separate computer-systems that are interconnected by logical transport paths;
- a plurality of system roles for each of the separate computer systems;
- system role types, each system role being associated with one of the system role types, low level operational tasks being assigned to the system role types, the system role types comprising source systems, follow-on systems, and target systems, the follow-on systems comprising at least one of a training system, a testing systems, and a quality assurance system;
- a transport track that defines a route through the separate computer systems in a particular order and that specifies one source system, at least one of the follow-on systems, and at least one target system;
- a first module to provide high level operational tasks in a software development system that define software changes;
- a second module to generate transport requests for transporting the software changes;
- a third module to automatically generate a separate and distinct low level operational required task list for each of the separate computer systems affected by the software changes by:
- analyzing the transport track(s) to establish which systems are affected by each high level operational task, to analyze the system role types of the affected systems, and to select low level operational tasks associated with the system role types according to the high level operational tasks; and
- a fourth module to execute the low level operational tasks in the respective list by the respective system for routing the transport requests through the system landscape and to effect the software changes.

* * * * *